(12) United States Patent
Huang et al.

(10) Patent No.: US 6,980,868 B2
(45) Date of Patent: Dec. 27, 2005

(54) SYSTEM AND METHOD FOR APPLICATION COMMUNICATION

(75) Inventors: C. J. Jason Huang, Taipei (TW); Jong-Min Deng, Taipei (TW)

(73) Assignee: Autotools Group Co., Ltd., Taipei (TW)

( * ) Notice: Subject to any disclaimer, the term of this patent is extended or adjusted under 35 U.S.C. 154(b) by 0 days.

(21) Appl. No.: 10/852,587

(22) Filed: May 24, 2004

(65) Prior Publication Data

US 2004/0254649 A1 Dec. 16, 2004

(30) Foreign Application Priority Data

May 28, 2003 (TW) ................................ 92114370 A

(51) Int. Cl.⁷ ............................................. G06F 15/173
(52) U.S. Cl. .............................. 700/11; 700/2; 700/83; 340/426.19; 370/252; 709/202; 709/220; 709/223
(58) Field of Search .................... 340/539.1, 426.19, 340/426.26, 825.72, 825.22; 370/252; 700/2, 700/11, 83; 709/202, 208, 224, 226; 715/716

(56) References Cited

U.S. PATENT DOCUMENTS

| | | | | |
|---|---|---|---|---|
| 5,787,259 | A * | 7/1998 | Haroun et al. | 709/253 |
| 6,052,750 | A * | 4/2000 | Lea | 710/72 |
| 6,546,419 | B1 * | 4/2003 | Humpleman et al. | 709/223 |
| 6,850,252 | B1 * | 2/2005 | Hoffberg | 715/716 |
| 6,885,641 | B1 * | 4/2005 | Chan et al. | 370/252 |
| 2002/0151992 | A1 * | 10/2002 | Hoffberg et al. | 700/83 |
| 2002/0156860 | A1 * | 10/2002 | Finke et al. | 709/208 |
| 2002/0188663 | A1 * | 12/2002 | Islam et al. | 709/202 |
| 2003/0227540 | A1 * | 12/2003 | Monroe | 348/14.02 |

* cited by examiner

*Primary Examiner*—Leo Picard
*Assistant Examiner*—Douglas S. Lee
(74) *Attorney, Agent, or Firm*—Snell & Wilmer L.L.P.

(57) ABSTRACT

A system and a method for integrating electronic apparatuses, e.g. information appliances, are provided. The present invention detects and stores the functions of each electronic apparatus in advance. When one of the electronic apparatuses transmits a signal to execute a particular function, the present invention determines which electronic apparatus is the most suitable to execute the function and sends the signal to the very electronic apparatus without manual operations.

9 Claims, 7 Drawing Sheets

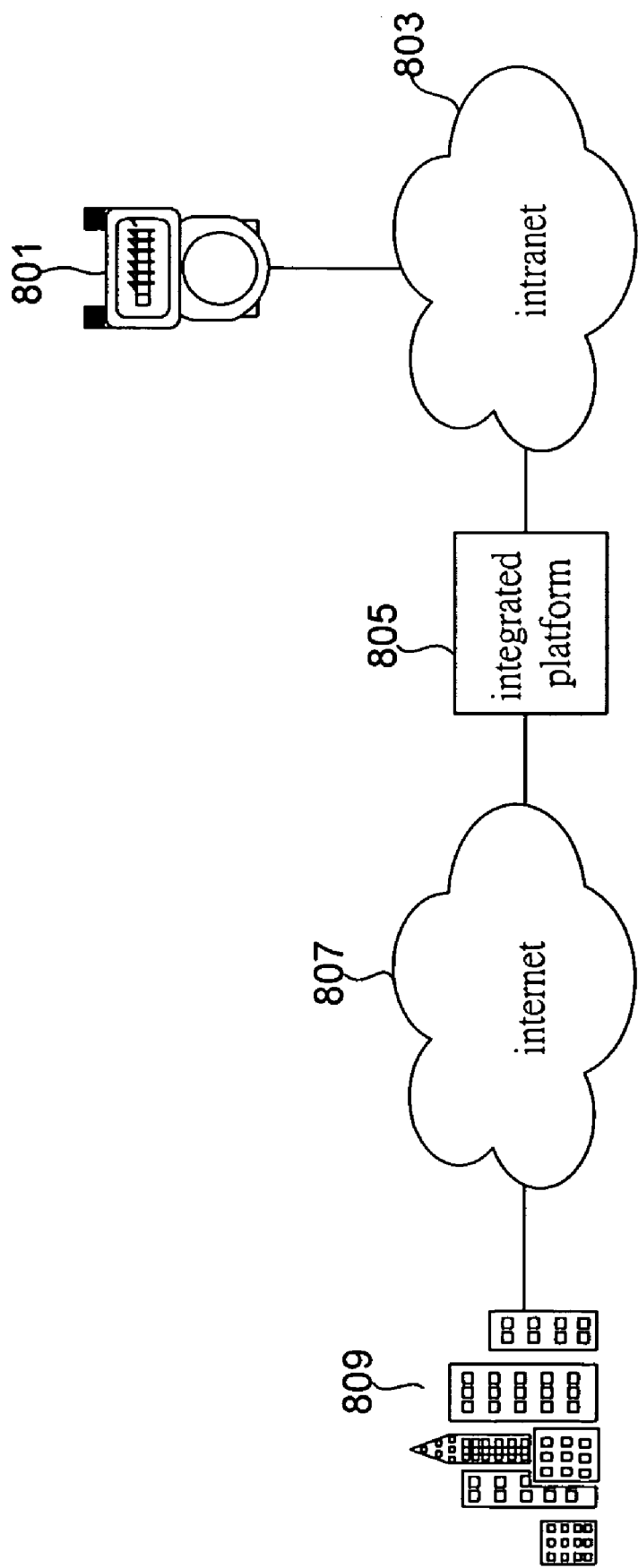

SYSTEM AND METHOD FOR APPLICATION COMMUNICATION

CROSS-REFERENCE TO RELATED APPLICATION

This Application claims priority to Taiwan Patent Application No. 092114370 filed on May 28, 2003.

FIELD OF INVENTION

The present invention relates to a system and a method for integrating electronic apparatuses, and more specifically relates to a system and a method for integrating information appliances.

BACKGROUND OF THE INVENTION

Most of the appliance products currently available in the market emphasize built-in artificial intelligence, i.e. they have capability to regulate their functions according to changes in the environment. One example is that an intelligent air conditioner can regulate the amount of cold air emission according to the room temperature. Another example is that an intelligent refrigerator can ring an alarm bell to remind users if the refrigerator door is open for a certain period of time.

Some systems claim to integrate these intelligent appliances. However, these systems require manual instructions to achieve true integration. As FIG. 1 shows, all intelligent appliances 105, 107, . . . , 113 are connected to a terminal 103 through an intranet 101. A user can input instructions via the terminal 103 to access any of the intelligent appliances 105, 107, . . . , 113 and integrate the use of them. For example, although a TV set 107 has its own audio output equipment, one can still instruct the terminal 103 to retrieve the audio signals of the TV set 107 and to transmit them to an audio player 109 for better audio quality.

The terminal 103 might be a personal computer or a microprocessor embedded in one of the intelligent appliances 105, 107, . . . , 113. Regardless of the terminal's structure, this system of the prior art requires a user to input instructions manually to transmit signals among the intelligent appliances 105, 107, . . . , 113. Besides, such a system cannot make an appropriate decision itself in terms of transmitting signals to the most appropriate intelligent appliance according to a user's location.

SUMMARY OF THE INVENTION

The present invention provides a system and a method for integrating information appliances. The system and the method detect and store the functions of the information appliances in advance. When one of the information appliances generates a signal, the present invention analyzes the signal and then transmits it to one of the information appliances appropriately without manual inputs.

The system of the present invention connects a plurality of information appliances through an intranet. Each information appliance includes an appliance I/O module, a function module and a generation module. The appliance I/O module, connected to the intranet, is configured as an I/O interface with the other information appliances. The function module is configured to store a first piece of information, which includes all functions of the corresponding information appliance. The generation module is configured to generate a second piece of information, which includes instructions for execution generated by the corresponding information appliance.

The system further includes an integrated platform for integrating the functions of the plurality of information appliances and delivering signals in between. The integrated platform includes a platform I/O module, an identification module and a transmission module. The platform I/O module, connected to the intranet, is configured as an I/O interface of the integrated platform The identification module, according to the first piece of information, is configured to identify and store the function(s) of each information appliance. The transmission module, according to the functions stored in the identification module, is configured to selectively transmit the second piece of information to one of the plurality of information appliances as appropriate.

The method of the present invention, according to the aforementioned system, includes the following steps. The system retrieves the first piece of information of each of the information appliances connected to the intranet and stores function information of the information appliances. When one of the information appliances generates an output signal, i.e. the second piece of information, to execute a particular function, the integrated platform receives and analyzes the output signal and transmits it to one of the information appliances appropriately according to an attribute of the output signal.

If the system further includes a sensor for detecting the location of a user, the step of transmitting the output signal further includes the steps of determining which information appliances are able to execute the output signal, sensing the location of the user, and, according to the location of the user, transmitting the output signal to one of the available information appliances.

BRIEF DESCRIPTION OF THE DRAWINGS

FIG. 8 illustrates a second embodiment of the present invention.

DETAILED DESCRIPTION

Figure 1:
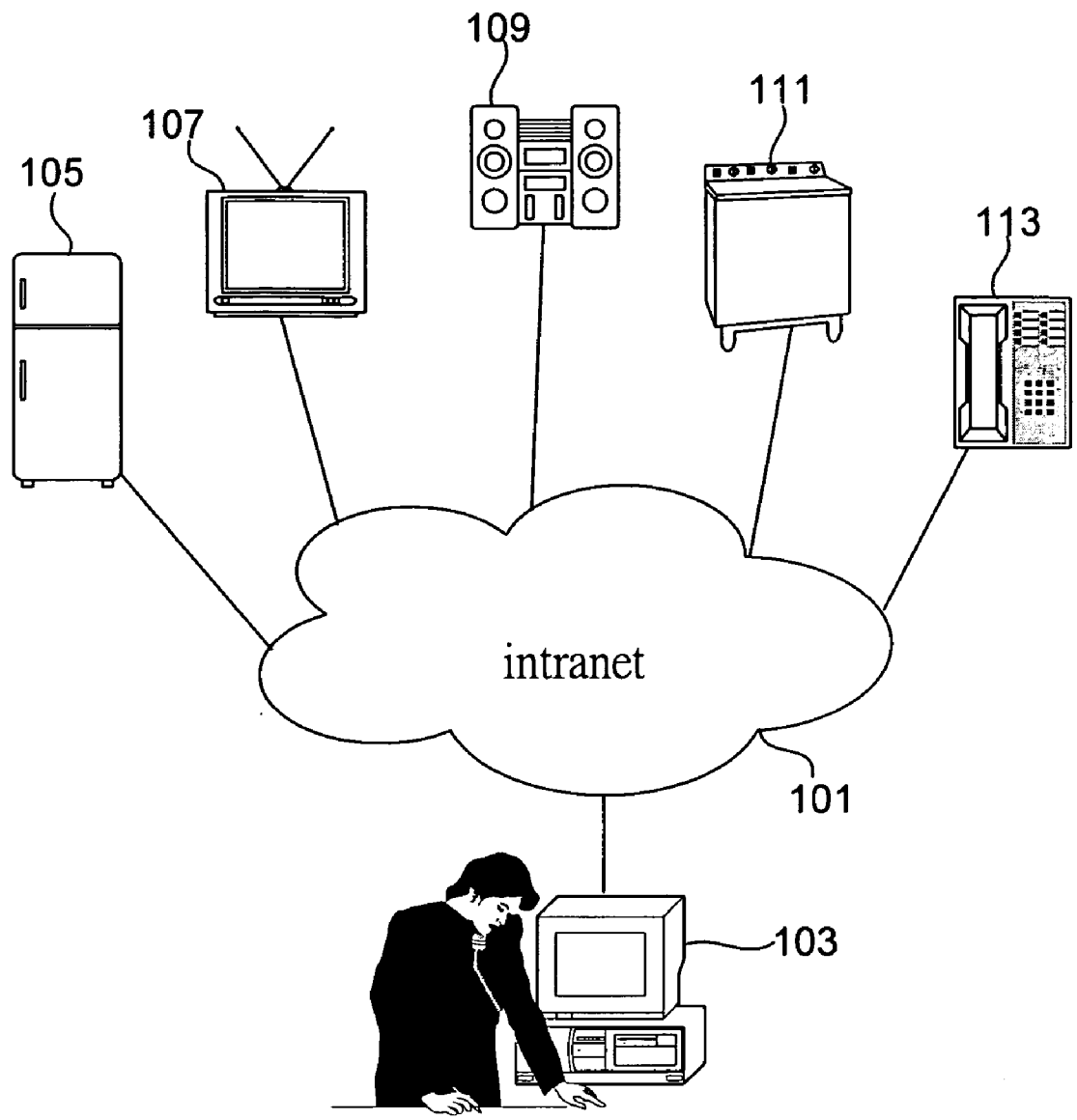
FIG. 1 illustrates the information appliance connections of the prior art.
Figure 2:
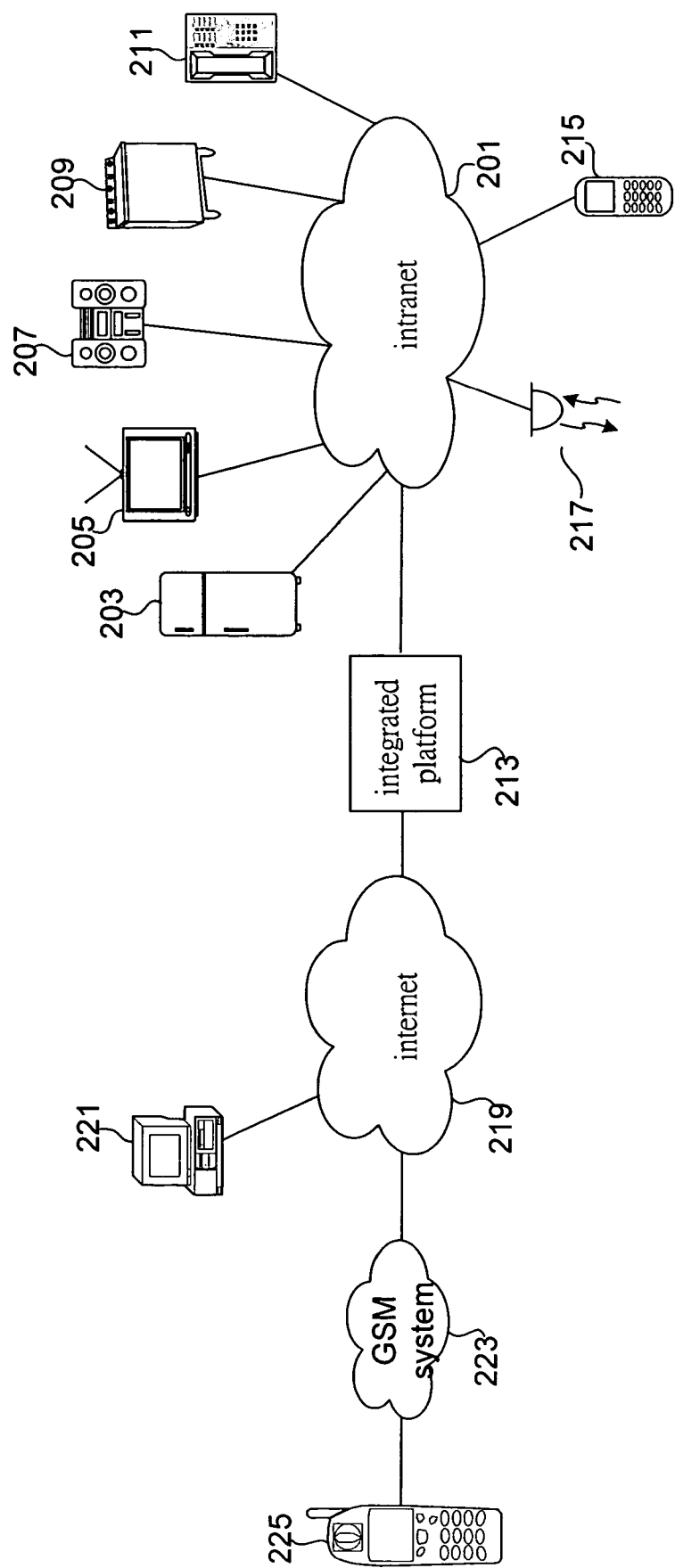
FIG. 2 illustrates the system of the present invention.

FIG. 2 shows a system for integrating information appliances provided by the present invention. A plurality of information appliances 203, 205, . . . , 211, not limited to the information appliances shown in FIG. 2, are connected together through an intranet 201 and are able to communicate with one another via an integrated platform 213. The system also includes an interface 215 and a sensor 217. The interface 215, connected to the integrated platform 213 via the intranet 201, is configured for a user to monitor the statuses of the plurality of information appliances 203, 205, . . . , 211, or for a user to input instructions manually. The sensor 217, connected to the integrated platform 213 via the intranet 201, is configured to detect the location of the user so that the integrated platform 213 can transmit signals to the most appropriate information appliance or the information appliance closest to the user according to the location of the user.

The integrated platform 213 may be connected to the Internet 219. When being outside of the intranet 201, the user might utilize a computer 221 to connect to the Internet 219 so that he can access the integrated platform 213 to monitor or control the plurality of information appliances 203, 205, . . . , 211. Alternatively, the user might utilize a mobile phone 225 via the protocol of the prior art between a GSM system 223 and the Internet 219 to monitor or control the plurality of information appliances 203, 205, . . . , 211 from a remote terminal outside the intranet 201.

Figure 3:
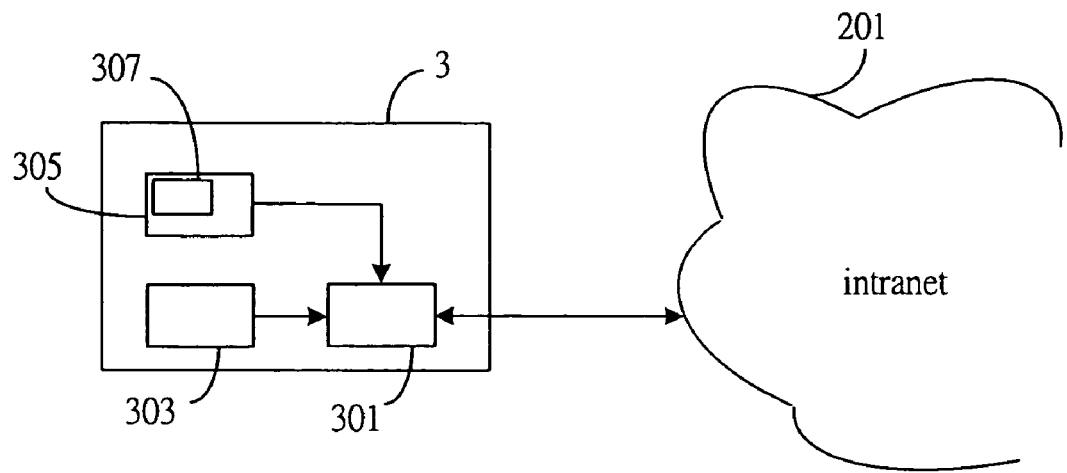
FIG. 3 illustrates the block diagram of an information appliance of the present invention.

As FIG. 3 shows, an information appliance 3 incorporated in the system of the present invention, e.g. one of the information appliances 203, 205, . . . , 211 in FIG. 2, includes an appliance I/O module 301, a function module 303 and a generation module 305. The appliance I/O module 301, connected to the intranet 201 of FIG. 2, is configured as an I/O interface of the information appliance 3. It is noted that the number of input and output terminals of the appliance I/O module 301 is based on its functionality. The function module 303 is configured to store a first piece of information that includes function information of the information appliance 3. The first piece of information is stored in a certain format readable by the integrated platform 213. The generation module 305 includes a memory 307 for storing all instructions the information appliance 3 might generate. When the information appliance 3 generates an output signal, the generation module 305 selects appropriate instructions from the memory 307 to form a second piece of information. The second piece of information is then transmitted to the integrated platform 213 via the appliance I/O module 301. For example, a TV set 205 shown in FIG. 2 mainly deals with video and audio signals so its appliance I/O module 301 includes a VGA input terminal for inputting video signals, an AV input terminal for inputting audio signals and at least one output terminal for outputting the first piece of information and the second piece of information. The first piece of information stored in the function module 303 of the TV set 205 records that video and audio signals are available for the TV set 305, and is transmitted to the integrated platform 213. When video or audio signals are generated by the other information appliances, the integrated platform 213 will receive these signals and determine which information appliance is the most suitable to execute them If the TV set 205 is determined to be the most suitable, the integrated platform 213 sends the video or audio signals to the VGA input terminal or the AV input terminal of the appliance I/O module 301 of the TV set 205 to display on the TV set 205. Alternatively, if the TV set 205 needs to output video or audio signals in a certain situation, the generation module 305 of the TV set 205 generates a second piece of information, including information of the video or audio signals, and then transmits it to the integrated platform 213 through the output terminal of the appliance I/O module 301.

Figure 4:
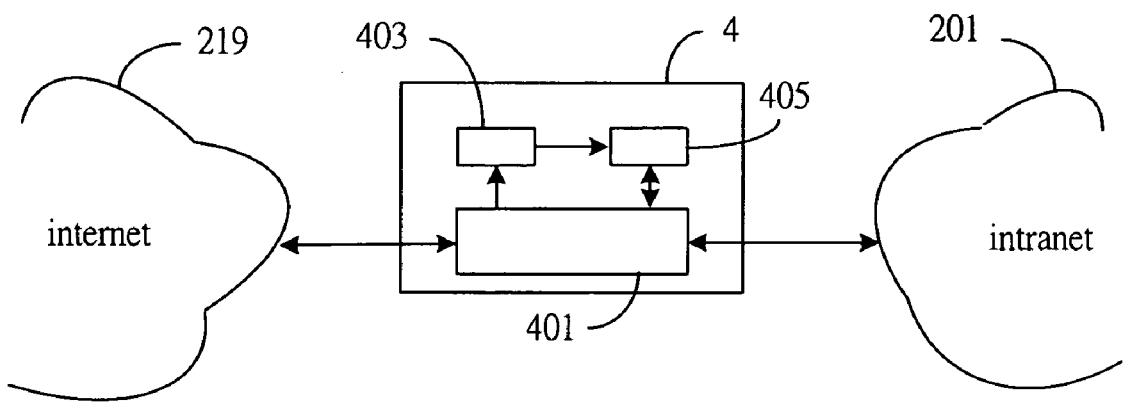
FIG. 4 illustrates the integrated platform of the present invention.

As FIG. 4 shows, an integrated platform 4, i.e. the integrated platform 213 in FIG. 2, includes a platform I/O module 401, an identification module 403 and a transmission module 405. The platform I/O module 401, connected to the intranet 201 and the Internet 219, is configured as an I/O interface of the integrated platform 4. The identification module 403 receives the first piece of information from the function module 303 of the information appliance 3 shown in FIG. 3 and, according to the first piece of information, identifies and stores the functions of the information appliance 3. The transmission module 405 is configured to receive the second piece of information from the information appliance 3 and, according to the characteristic of the second piece of information and the function information stored in the identification module 403, selectively transmit the second piece of information to an appropriate information appliance for execution. Before transmitting, the transmission module 405 converts the format of the second piece of information into the format recognizable by the appropriate information appliance.

Figure 5:
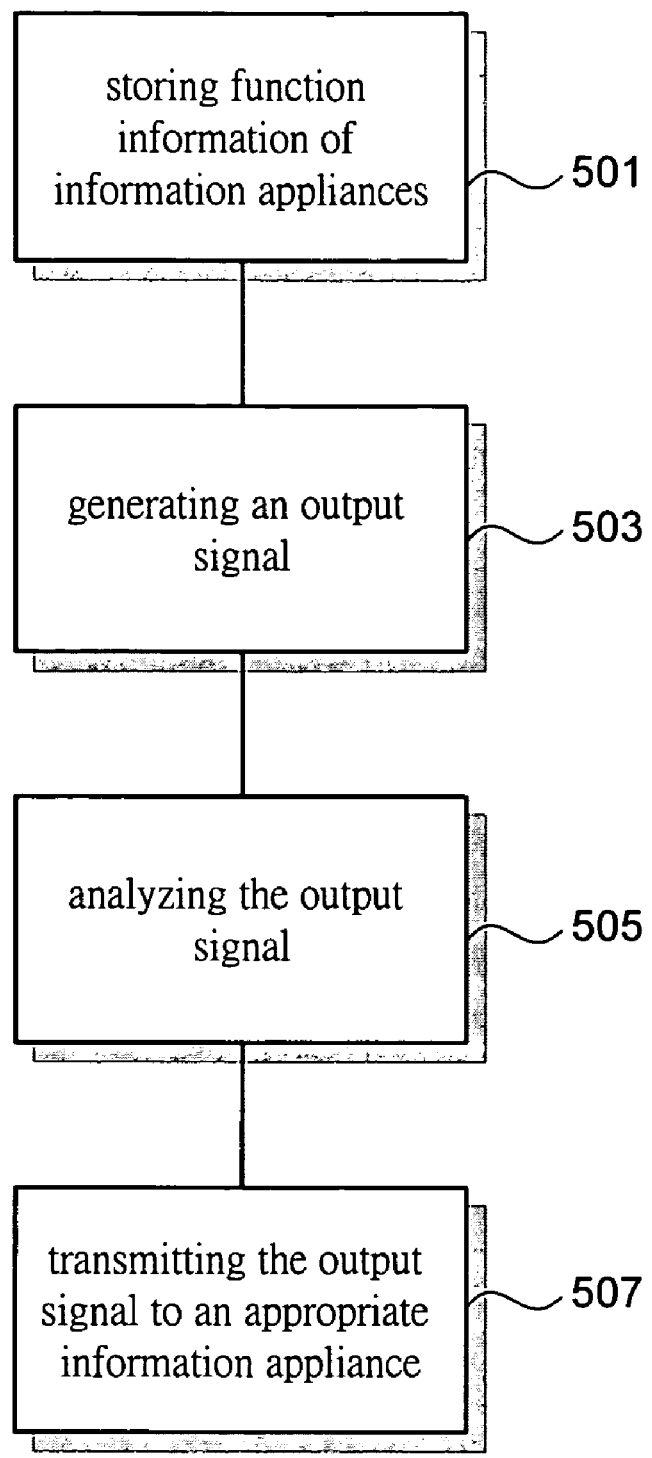
FIG. 5 illustrates the flow chart of the method provided by the present invention.

According to the aforementioned system, the present invention further provides a method for integrating a plurality of information appliances. Now referring to FIG. 2 and FIG. 5, in step 501 the integrated platform 213 receives and stores function information, i.e. the first piece of information, of the plurality of information appliances 203, 205, . . . , 211. In step 503, one of the plurality of information appliances 203, 205, . . . , 211 generates an output signal, i.e. a second piece of information, and transmits it to the integrated platform 213. In step 505, the integrated platform 213 analyzes the attribute of the output signal. In step 507, the integrated platform 213 determines which information appliance is the most suitable to process the output signal and transmits the output signal to the most suitable information appliance according to the attribute of the output signal.

Figure 6:
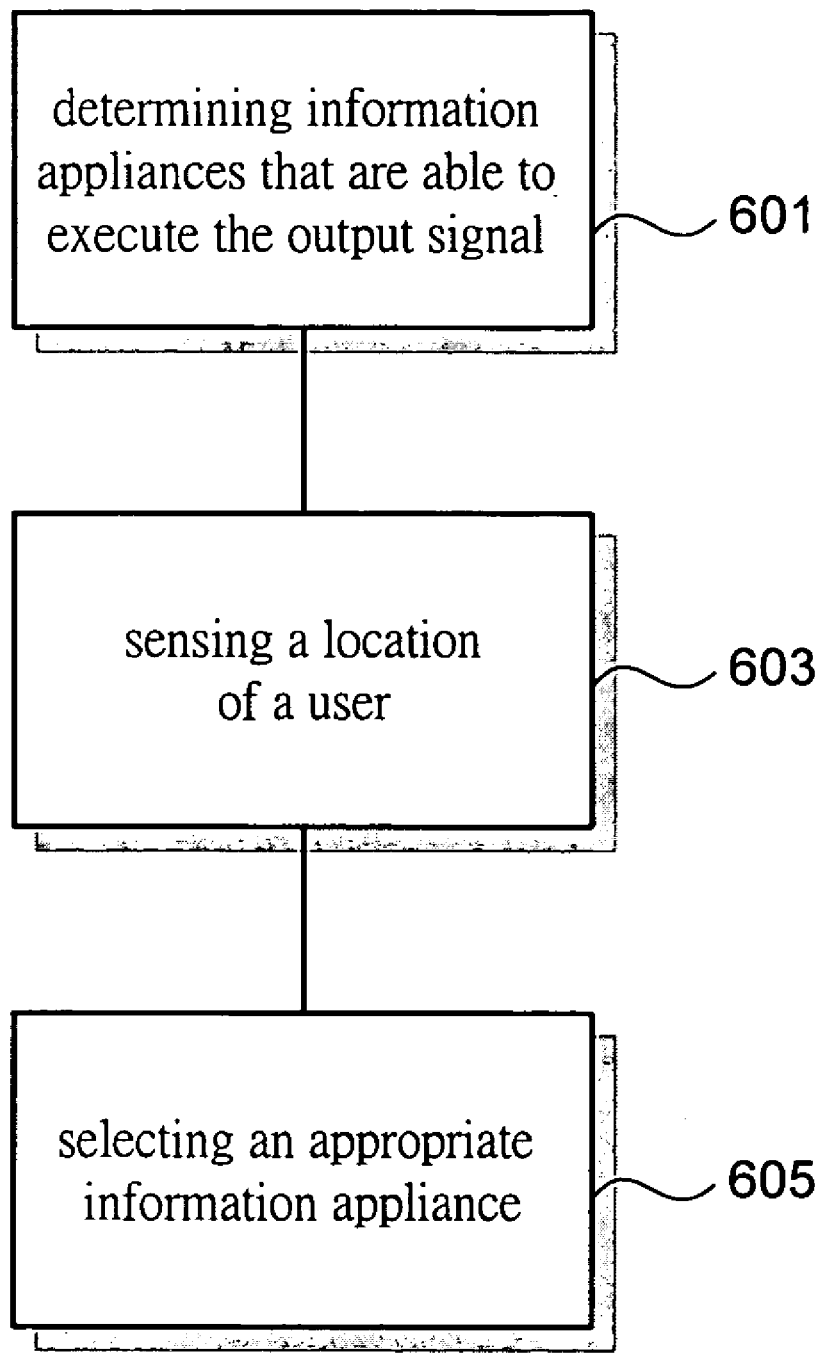
FIG. 6 illustrates the flow chart of selecting an appropriate information appliance when the system includes sensors.

More specifically, step 507 further includes the following steps shown in FIG. 6. In step 601, the integrated platform 213 determines which information appliances are able to execute the output signal. In step 603, the integrated platform 213 senses the user's location via the sensor 217. In step 605, the integrated platform 213 selects the most suitable information appliance and transmits the output signal to it according to the location of the user.

Figure 7:
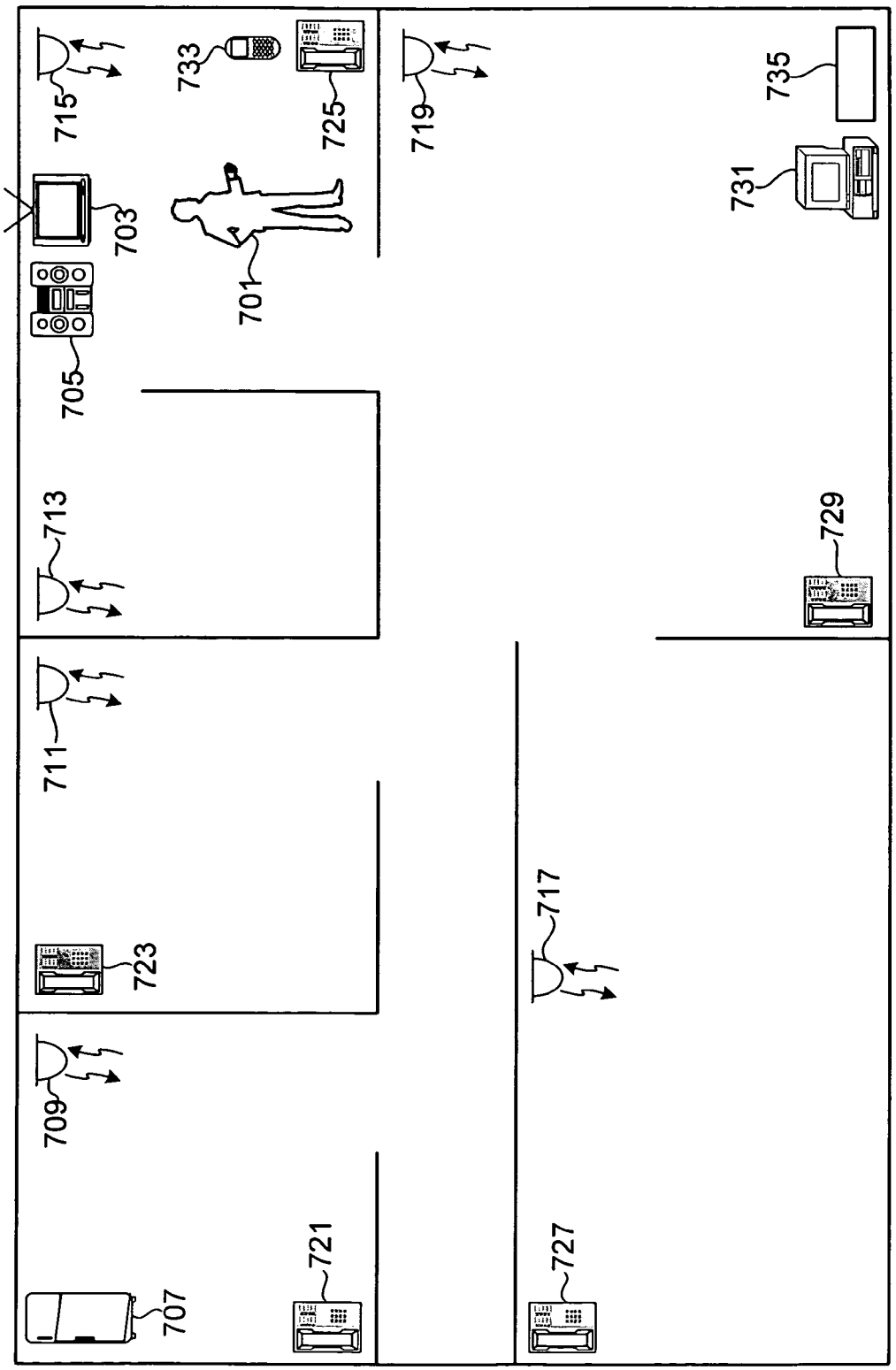
FIG. 7 illustrates a first embodiment of the present invention.

A first embodiment of the present invention is a system for integrating information appliances at home. As FIG. 7 shows, the information appliances in the house includes a TV set 703, an audio player 705, a refrigerator 707, sensors 709, 711, . . . , 719, a telephone 721, 723, . . . , 729 and a computer 731. These information appliances 703, 705, . . . , 731 are all connected to an integrated platform 735 through an intranet (not shown). When a user 701 turns on a disc reader, such as a DVD player, of the computer 731 to access data with video and audio signals, such as a movie recorded on a DVD disc, the integrated platform 735 first senses the location of the user 701 via the sensors 709, 711, . . . , 719 and then transmits the video signals retrieved by the disc reader to the TV set 703 and transmits the audio signals retrieved by the disc reader to the audio player 705. Therefore, the user 701 can enjoy the movie played in the computer 731 without having to sit in front of the computer 731.

Besides, if the function module of the refrigerator 707 records a reminder function, i.e. the refrigerator 707 can send an audio or video signal to warn the user 701 when the refrigerator door is open for a certain period of time, the integrated platform 735 receives a reminder signal from the refrigerator 707 and detects the location of the user 701 via the sensors 709, 711, . . . , 719. Once determining the location of the user 701, the integrated platform 735 transmits the reminder signal to the TV set 703 to display the warning on the screen or to the audio player 705 to issue a sound reminding the user 701 that the refrigerator door is open.

Similarly, if a phone call reaches the house, the integrated platform 735 can make the telephone 725 ring so that the user 701 can answer it from the nearest phone.

The above exemplary functions do not need configuration on the user's part. The integrated platform 735 automatically detects all functions of the information appliances in the intranet and optimizes the utilization of the information appliances. Moreover, the user 701 can monitor the status of each of the information appliances or input instructions manually via the interface 733, e.g. adjusting the volume of the audio player 705. The user 701 in a remote place can also monitor the status of each of the information appliances as long as the integrated platform 735 is connected to the Internet.

A second embodiment of the present invention, as FIG. 8 shows, is applied for an energy company to monitor utility statuses on the client ends. A gas meter 801 installed in each of the client ends is an information appliance of the present invention and is connected to an intranet 803. A gas company 809 sends a message, via the Internet 807, to ask an integrated platform 805 to report the gas meter back. The integrated platform 805 retrieves the information from the gas meter 801 through the intranet 803 and returns the information to the gas company 809. Therefore, the gas company 809 may get gas meter information without spending much time and manpower. The above-mentioned system of the second embodiment can also be applied to other energy companies, such as an electricity company.

The above description of the preferred embodiments is expected to clearly expound the characteristics of the present invention but not expected to restrict the scope of the present invention. Those skilled in the art will readily observe that numerous modifications and alterations of the system may be made while retaining the teaching of the invention. Accordingly, the above disclosure should be construed as limited only by the bounds of the claims.

What is claimed is:

1. A system for integrating information appliances, comprising:
   an intranet;
   a plurality of information appliances, each information appliance comprising:
   an appliance I/O module connected to the intranet;
   a function module for storing a first piece of information, the first piece of information comprising a function of each corresponding information appliance; and
   a generation module for generating a second piece of information, the second piece of information comprising an instruction for execution generated by each corresponding information appliance;
   an integrated platform, comprising:
   a platform I/O module connected to the intranet;
   an identification module, according to the first piece of information, for identifying and storing the function of each information appliance; and
   a transmission module, according to the function stored in the identification module, for selectively transmitting the second piece of information to one of the plurality of information appliances; and
   a sensor, connected to the platform I/O module via the intranet, for detecting a location of a user, the transmission module transmitting the second piece of information to the one of the plurality of information appliances according to the location of the user.

2. The system of claim 1, further comprising an interface, connected to the platform I/O module via the intranet, for a user to monitor the plurality of information appliances.

3. The system of claim 1, wherein the platform I/O module, connected to an Internet, is configured for a user to monitor the plurality of information appliances from a remote terminal outside the intranet.

4. The system of claim 1, wherein the generation module comprises a memory for storing the second piece of information.

5. The system of claim 1, wherein, before transmitting the second piece of information, the transmission module converts a format of the second piece of information to a format the one of the plurality of information appliances can recognize.

6. A system for integrating information appliances, comprising:
   an intranet;
   a plurality of information appliances, each information appliance comprising:
   an appliance I/O module connected to the intranet;
   a function module for storing a first piece of information, the first piece of information comprising a function of each corresponding information appliance; and
   a generation module for generating a second piece of information, the second piece of information comprising an instruction for execution generated by each corresponding information appliance;
   an integrated platform, comprising:
   a platform I/O module, connected to the intranet and an Internet, for a user to monitor the plurality of information appliances from a remote terminal outside the intranet;
   an identification module, according to the first piece of information, for identifying and storing the function of each information appliance; and
   a transmission module, according to the function stored in the identification module, for selectively transmitting the second piece of information to one of the plurality of information appliances;
   an interface, connected to the platform I/O module via the intranet, for the user to monitor the plurality of information appliances; and
   a sensor, connected to the platform I/O module via the intranet, for detecting a location of the user, the transmission module transmitting the second piece of information to the one of the plurality of information appliances according to the location of the user.

7. The system of claim 6, wherein the generation module comprises a memory for storing the second piece of information.

8. The system of claim 6, wherein, before transmitting the second piece of information, the transmission module converts a format of the second piece of information to a format the one of the plurality of information appliances can recognize.

9. A method for integrating a plurality of information appliances, comprising:
   (a) storing function information of the plurality of information appliances;
   (b) one of the plurality of information appliances generating an output signal;
   (c) analyzing the output signal; and
   (d) transmitting the output signal to one of the plurality of information appliances according to an attribute of the output signal;
   wherein the step (d) further comprises:
   (e) determining at least one of the plurality of information appliances that are able to execute the output signal;
   (f) sensing a location of a user; and
   (g) transmitting the output signal to one of the at least one of the plurality of information appliances determined in the step (e) according to the location of the user.

* * * * *